United States Patent
Nagamine et al.

(10) Patent No.: US 9,577,232 B2
(45) Date of Patent: Feb. 21, 2017

(54) POWER STORAGE DEVICE (71) Applicants: Koichi Nagamine, Toyota (JP); Takanori Kumagai, Nagoya (JP); Masahiko Kitamura, Nisshin (JP); Takuya Ishiguro, Obu (JP)

(72) Inventors: Koichi Nagamine, Toyota (JP); Takanori Kumagai, Nagoya (JP); Masahiko Kitamura, Nisshin (JP); Takuya Ishiguro, Obu (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/425,904

(22) PCT Filed: Dec. 2, 2013

(86) PCT No.: PCT/IB2013/002972
§ 371 (c)(1),
(2) Date: Mar. 4, 2015

(87) PCT Pub. No.: WO2014/195759
PCT Pub. Date: Dec. 11, 2014

(65) Prior Publication Data
US 2015/0295215 A1  Oct. 15, 2015

(30) Foreign Application Priority Data

Dec. 4, 2012  (JP) .................. 2012-264989

(51) Int. Cl.
*H01M 2/12* (2006.01)
*H01M 2/10* (2006.01)
(Continued)

(52) U.S. Cl.
CPC .......... *H01M 2/1223* (2013.01); *B60L 3/0046* (2013.01); *B60L 11/1864* (2013.01);
(Continued)

(58) Field of Classification Search
CPC .............. H01M 2/1077; H01M 10/625; H01M 10/6555; H01M 10/613; H01M 10/6556; H01M 2/1223; Y02E 60/13; B60L 3/0046; B60L 11/1864
See application file for complete search history.

(56) References Cited

U.S. PATENT DOCUMENTS

2010/0167116 A1* 7/2010 Okada ................. H01M 2/1077
429/158
2011/0162820 A1  7/2011 Weber et al.
2012/0189885 A1  7/2012 Kishii et al.

FOREIGN PATENT DOCUMENTS

JP  2003-100267 A  4/2003
JP  2009-170258 A  7/2009
JP  2012-109126 A  6/2012

* cited by examiner

*Primary Examiner* — Emily Le
*Assistant Examiner* — Monique Wills
(74) *Attorney, Agent, or Firm* — Sughrue Mion, PLLC (57) ABSTRACT

The power storage device comprises a plural cell, an exhaust passage and a sealing plate. The plural cells is aligned in a first direction, each of the cells includes a gas discharging valve for discharging a gas generated in the cell, each of the gas discharging valves is provided on a first side in a second direction of the cell, and the second direction is orthogonal to the first direction. The exhaust passage is configured to discharge the gas discharged from each of the gas discharging valves, extends in the first direction, and has an opening at a first end in the first direction. The sealing plate is provided at a second end of the exhaust passage in the first direction, includes plural recesses on a surface on the exhaust passage side of the sealing plate, and made of a resin.

7 Claims, 7 Drawing Sheets

(51) Int. Cl.
    *B60L 3/00*           (2006.01)
    *B60L 11/18*         (2006.01)
    *H01M 10/613*      (2014.01)
    *H01G 11/10*        (2013.01)
    *H01G 11/18*        (2013.01)
    *H01G 11/80*        (2013.01)
    *H01M 10/6556*     (2014.01)
    *H01M 10/6561*     (2014.01)
    *H01M 10/625*      (2014.01)
    *H01M 10/6555*     (2014.01)

(52) U.S. Cl.
    CPC ....... *B60L 11/1874* (2013.01); *B60L 11/1879* (2013.01); *H01G 11/10* (2013.01); *H01G 11/18* (2013.01); *H01G 11/80* (2013.01); *H01M 2/1077* (2013.01); *H01M 2/1229* (2013.01); *H01M 2/1252* (2013.01); *H01M 10/613* (2015.04); *H01M 10/6556* (2015.04); *H01M 10/6561* (2015.04); *H01M 10/625* (2015.04); *H01M 10/6555* (2015.04); *Y02E 60/13* (2013.01); *Y02T 10/7005* (2013.01); *Y02T 10/7022* (2013.01); *Y02T 10/7061* (2013.01)

POWER STORAGE DEVICE

BACKGROUND OF THE INVENTION

1. Field of the Invention

The present invention relates to a power storage device.

2. Description of Related Art

A power storage device has conventionally been known that has: plural power storage elements, each of which includes a valve for discharging a gas generated therein and that are aligned in a specified direction; a pair of end plates that holds the plural power storage elements therebetween in the specified direction; plural joining members that extend in the specified direction and are fixed to the pair of end plates; and a case for housing the plural power storage elements, and in which the plural joining members are disposed along outer surfaces of the plural power storage elements, each of which is provided with the valve, contact an inner wall surface of the case, and, together with the case, form a moving space (exhaust passage) for the gas discharged from the valve (see Japanese Patent Application Publication No. 2012-109126 (JP 2012-109126 A), for example).

One end of the exhaust passage is connected to an exhaust duct on the outside of the power storage device. Meanwhile, another end of the exhaust passage should effectively be sealed by a certain member. In this case, if a sealing plate that is made of a resin is used to seal the other end, the resinous sealing plate may be melted under the influence of the heat of such a gas at an extremely high temperature. The temperature of the gas immediately after being discharged from the valve is typically at least twice as high as a heat resistant temperature of a general resin material. In order to handle the above problem, it can be considered to form such a sealing plate by a heat resistant resin. However, this produces a problem of cost increase.

SUMMARY OF THE INVENTION

The present invention provides a power storage device in which another end of an exhaust passage is sealed by a resinous sealing plate and that can prevent the sealing plate from being melted by the heat of a gas.

In a first aspect of the present invention, the power storage device has a following structure. The power storage device comprises plural cells, an exhaust passage and a sealing plate. The plural cells is aligned in a first direction, each of the cells includes a gas discharging valve for discharging a gas generated in the cell, each of the gas discharging valves is provided on a first side in a second direction of the cell, and the second direction is orthogonal to the first direction. The exhaust passage is configured to discharge the gas discharged from each of the gas discharging valves of the plural cells, the exhaust passage extends in the first direction, and the exhaust passage has an opening at a first end in the first direction. The sealing plate is provided at a second end of the exhaust passage in the first direction, the sealing plate includes plural recesses on a surface on the exhaust passage side of the sealing plate, and the sealing plate is made of a resin.

According to the power storage device in the present invention, it is possible to prevent the resinous sealing plate from being melted by the heat of the gas while sealing the other end of the exhaust passage by the sealing plate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
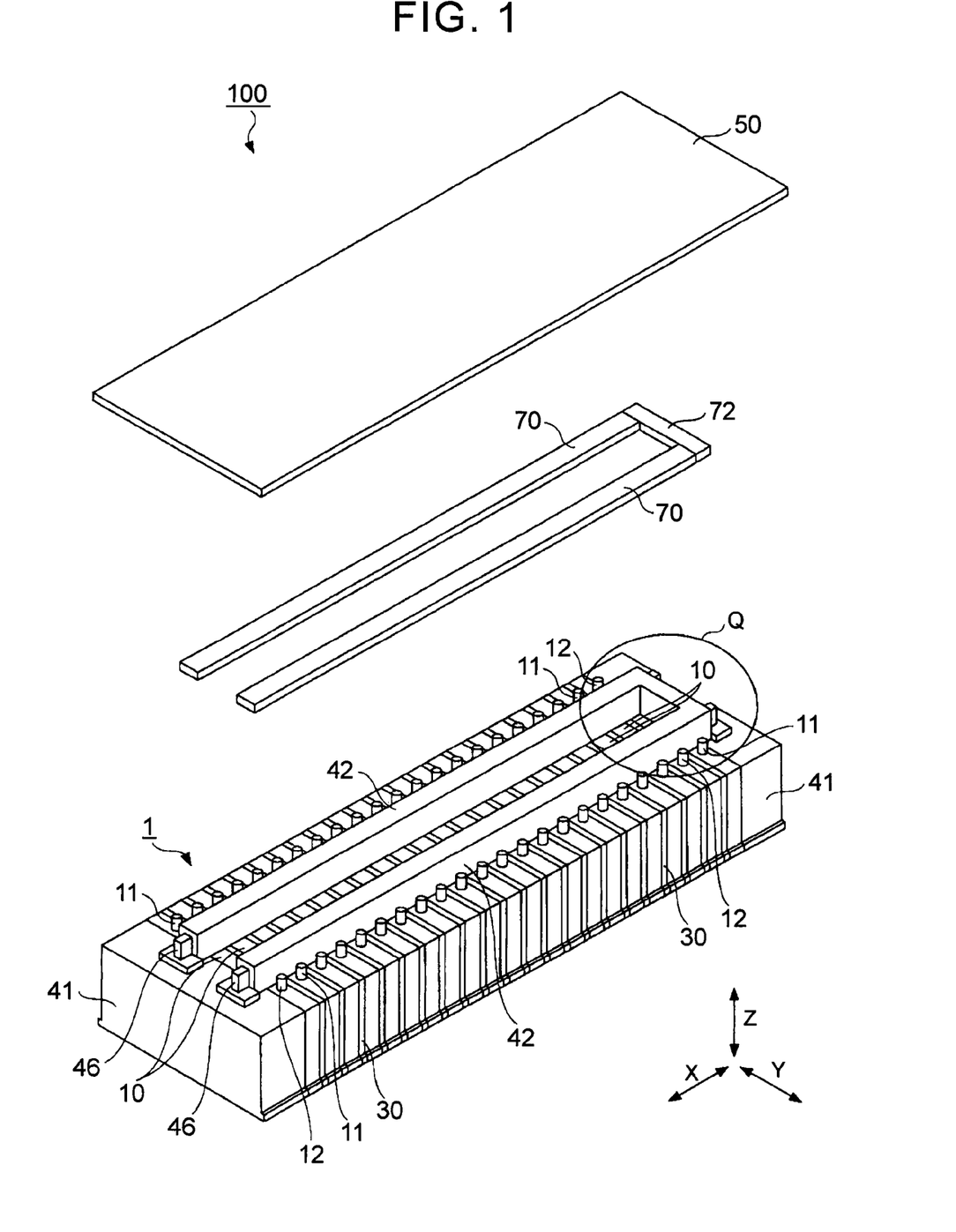
FIG. 1 is an external view for schematically showing a battery pack 100 according to one embodiment.
Figure 2:
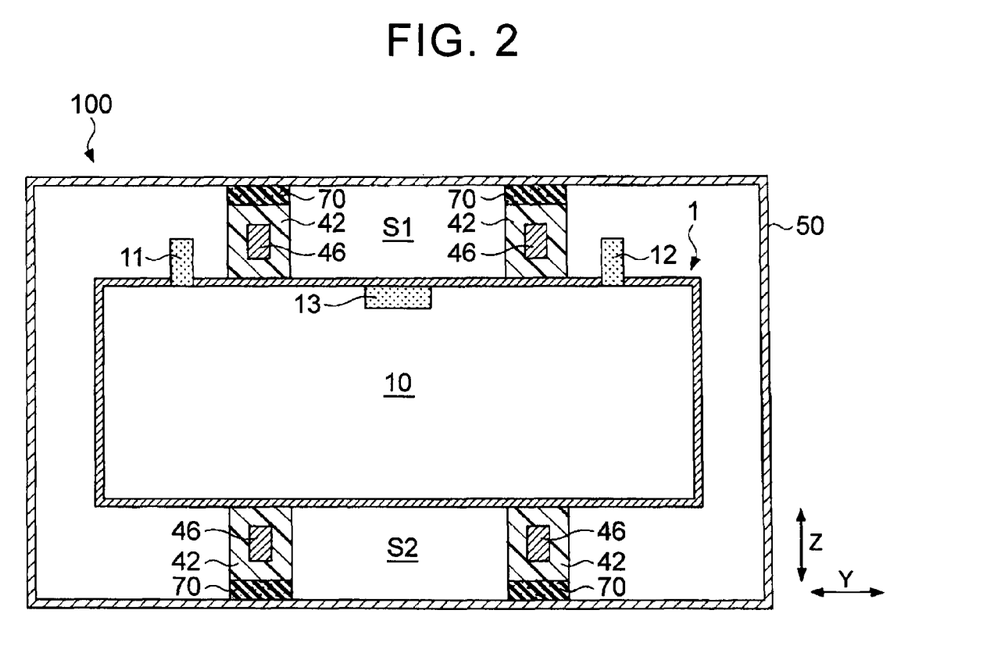
FIG. 2 is a view for schematically showing a cross section of the battery pack 100 cut in a Y-Z plane.
Figure 3:
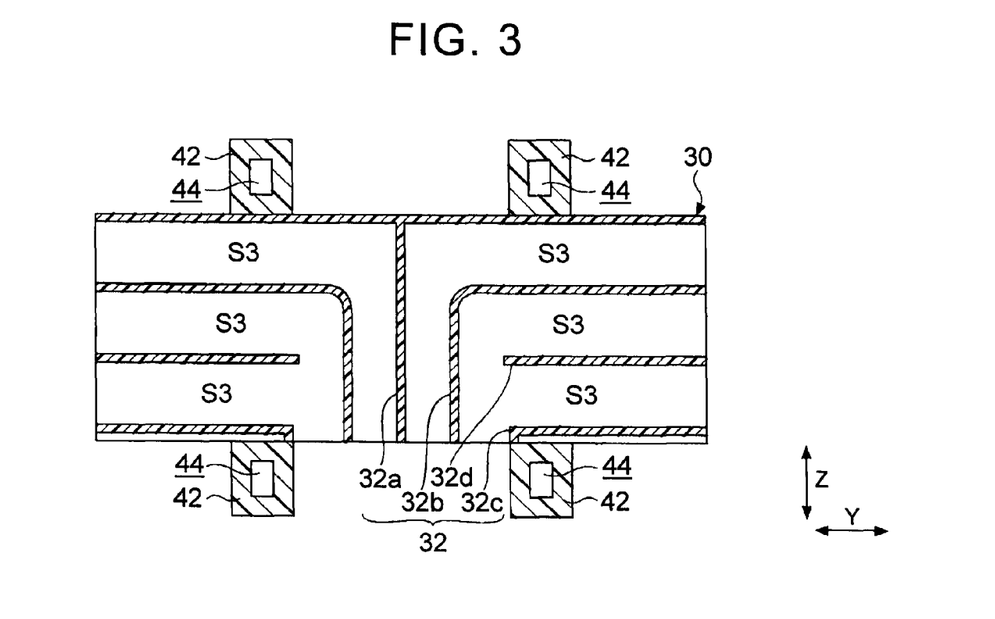
FIG. 3 is a view for schematically showing an example of a partitioning member 30 when seen in an X-direction.

FIG. 1 is an external view for schematically showing a battery pack 100 according to one embodiment. In FIG. 1, only an upper portion of a pack case 50 is, shown, and the pack case 50 is separated from a cell stack 1 as a matter of convenience. Seal members 70, 72 are also shown separately from the cell stack 1. FIG. 2 is a cross-sectional view of the battery pack 100 in a Y-Z plane. In FIG. 1 and FIG. 2, X-direction, Y-direction, and Z-direction are orthogonal to each other. It should be noted that an up-down direction, a right-left direction, and the like change according to an installation state of a power storage device or a direction in which the power storage device is seen. However, the Z-direction corresponds to a vertical direction (up-down direction) in the following description as a matter of convenience, and, with reference to the drawings, the upper side of each of the drawings is referred to as the "upper side". The Y-direction corresponds to the right-left direction with reference to the drawings. FIG. 3 is a view for schematically showing an example of a partitioning member 30 when the partitioning member 30 is seen in the X-direction.

The battery pack 100 can be installed in a vehicle. Examples of the vehicle include a hybrid automobile and an electric automobile. The hybrid automobile is a vehicle that includes both an electric motor and an internal combustion engine as power sources for driving the vehicle. The electric automobile is a vehicle that only includes the electric motor as the power source of the vehicle. In either case, the battery pack 100 can be used as an electric power source for the electric motor.

The battery pack 100 contains the cell stack 1 and the pack case 50.

The cell stack 1 has plural unit cells 10. The plural unit cells 10 are aligned in the X-direction as shown in FIG. 1.

The pack case 50 is an example of a cover member and is an exterior for housing the entire cell stack 1. In other words, the pack case 50 is provided to cover upper and lower surfaces, both side surfaces, and both end surfaces of the entire cell stack 1. That is, the pack case 50 covers end surfaces of the cell stack 1 in the Z-direction, end surfaces thereof in the Y-direction, and end surfaces thereof in the X-direction. The pack case 50 may be formed of a metal (sheet metal member, for example). The pack case 50 may be configured by bonding a plurality of parts. Various ducts such as an intake duct 61 and an exhaust duct 62 may be connected to the pack case 50 so as to communicate with the inside of the pack case 50 (see FIG. 5).

The unit cell 10 may be any secondary battery such as a nickel hydrogen battery or a lithium ion battery. Instead of being the secondary battery, the unit cell 10 may be an electric double-layered capacitor. It should be noted that the number of unit cell 10 can appropriately be determined according to required output of the cell stack 1, for example.

A positive electrode terminal 11 and a negative electrode terminal 12 are provided on a top surface of the unit cell 10. The positive electrode terminal 11 and the negative electrode terminal 12 are provided with a specified distance therebetween in the Y-direction. The plural unit cells 10 may electrically be connected in series. More specifically, the positive electrode terminal 11 of one of the unit cells 10 may electrically be connected to the negative electrode terminal 12 of another of the unit cells 10 by a bus bar (not shown).

A valve 13 is provided on the top surface of the unit cell 10. The valve 13 is used to discharge a gas that is generated in the unit cell 10 to the outside of the unit cell 10. Due to a sealed state of the unit cell 10, internal pressure of the unit cell 10 increases along with generation of the gas when the gas is generated in the unit cell 10. When the internal pressure of the unit cell 10 reaches working pressure of the valve 13, the valve 13 is changed from a closed state to an open state. Accordingly, the gas that is generated in the unit cell 10 can be discharged to the outside of the unit cell 10.

The valve 13 is disposed in the Y-direction between the positive electrode terminal 11 and the negative electrode terminal 12. In an example shown in FIG. 1, the valve 13 is disposed in such a position that a distance from the positive electrode terminal 11 is equal to a distance from the negative electrode terminal 12. By providing the valve 13 on the top surface of the unit cell 10, the gas generated in the unit cell 10 can easily be discharged from the valve 13. It should be noted that the valve 13 can appropriately be positioned.

Any structure can be adopted for the valve 13, and the valve 13 may be a so-called breaking valve or a so-called returning valve. The breaking valve irreversibly changes from a closed state to an open state. For example, the breaking valve can be formed by creating a marking in a portion of a battery case. The returning valve reversibly changes from a closed state to an open state. In other words, the valve changes between the closed state and the open state according to a magnitude relation between the internal pressure and external pressure of the unit cell 10. The returning valve can be configured of a lid for closing a moving passage of the gas and a spring that urges the lid in one direction, for example.

The partitioning member 30 is disposed between the two adjacent unit cells 10 in the X-direction. The partitioning member 30 has a function as a spacer. The partitioning member 30 may be formed of an insulating material such as a resin. Although the partitioning member 30 may be formed of any resin material, it may be formed of a general resin material such as polypropylene (PP) or polyamide nylon (PA), for example, instead of an expensive heat-resistant resin material.

As shown in FIG. 2 and FIG. 3, the partitioning member 30 has plural joining sections 42 that are projected to both sides in the Z-direction, that is, to the upper side and the lower side. More specifically, each of the partitioning members 30 has two joining sections 42 on the upper side that are projected on both sides of the valve 13 in the unit cell 10 in the Y-direction, and also has the two joining sections 42 on the lower side. The joining sections 42 may differ in length in the Z-direction or position in the Y-direction between the upper side and the lower side. A further detail of an example of the partitioning member 30 will be described later.

A pair of end plates 41 is disposed at both ends of the cell stack 1 in the X-direction. A restraining member (flat band) 46 that is made of a metal is bonded to the end plate 41. The two restraining members 46 may be provided on the upper side of the cell stack 1. The two restraining members 46 are disposed with a space therebetween in the Y-direction and extend in the X-direction, and ends of the restraining member 46 are joined to the paired end plates 41. It should be noted that any method can be used to fix the restraining member 46 to the end plate 41 and that a fixing method such as that using a bolt, that using a rivet, or that by welding can be used. Similarly, the two restraining members 46 may be provided on the lower side of the cell stack 1. The restraining member 46 has a function to apply a binding force to the plural unit cells 10. The binding force is a force to hold the unit cells 10 in the X-direction. The application of the binding force to the unit cells 10 can prevent expansion of the unit cells 10, for example. In a structure in which two each of the restraining members 46 are used on the upper side and the lower side of the cell stack 1, it is possible to prevent concentration of the binding force in one location and thus to apply the binding force to the unit cells 10 evenly.

As shown in FIG. 2, an exhaust passage S1 is formed on the upper side of the unit cell 10. The inside of each of the unit cells 10 is communicated with the exhaust passage S1 via the valve 13. Thus, the exhaust passage S1 functions to discharge the gas that is generated in each of the unit cells 10 to the outside of the battery pack 100. As shown in FIG. 2, the exhaust passage S1 is defined by the joining sections 42 on the upper side of each of the partitioning members 30, the pack case 50, and the top surface of each of the unit cells 10. The exhaust passage S1 extends in the X-direction, and one end thereof is opened (see FIG. 5) while another end thereof is sealed by a sealing member 20, which will be described later. The seal member 70 is preferably provided between the pack case 50 and a top surface of the joining section 42 on the upper side of each of the partitioning members 30. In addition, the seal member 72 is preferably provided between a top surface of the sealing member 20 and the pack case 50 in a similar manner. The seal members 70, 72 may be formed of a sponge or rubber, for example. The seal member 70 extends in the X-direction along the joining section 42 on the upper side of each of the partitioning members 30. Meanwhile, the seal member 72 extends in the Y-direction along the top surface of the sealing member 20. The seal members 70, 72 may be abutted against each other to seal each other. It is possible by having the seal members 70, 72 to improve airtightness and thus to reduce leakage of the gas from the exhaust passage S1. It should be noted that a cross-sectional shape of the exhaust passage S1 in the Z-Y direction may be constant or changed as the exhaust passage S1 advances in the X-direction.

As shown in FIG. 2, a supply passage S2 is formed on the lower side of the unit cell 10. A refrigerant is supplied from a refrigerant supply source (not shown) on the outside of the battery pack 100. The refrigerant is typically a gas such as air; however, it can also be a fluid such as water. It should be noted that the refrigerant is assumed to be the air in the following description. As shown in FIG. 2 and FIG. 3, the supply passage S2 is defined by the joining sections 42 on the lower side of each of the partitioning members 30, the pack case 50, and a lower surface of each of the unit cells 10. The supply passage S2 extends in the X-direction, and one end thereof may be opened (see FIG. 5) while another end may be sealed. The seal member 70 may be provided between the pack case 50 and the lower surface of the joining section 42 on the lower side of each of the partitioning members 30. It is possible by having the seal member 70 to improve the airtightness and thus to reduce leakage of the refrigerant that flows through the supply passage S2. It should be noted that a cross-sectional shape of the supply passage S2 in the Z-Y direction may be constant or changed as the supply passage S2 advances in the X-direction.

Figure 4:
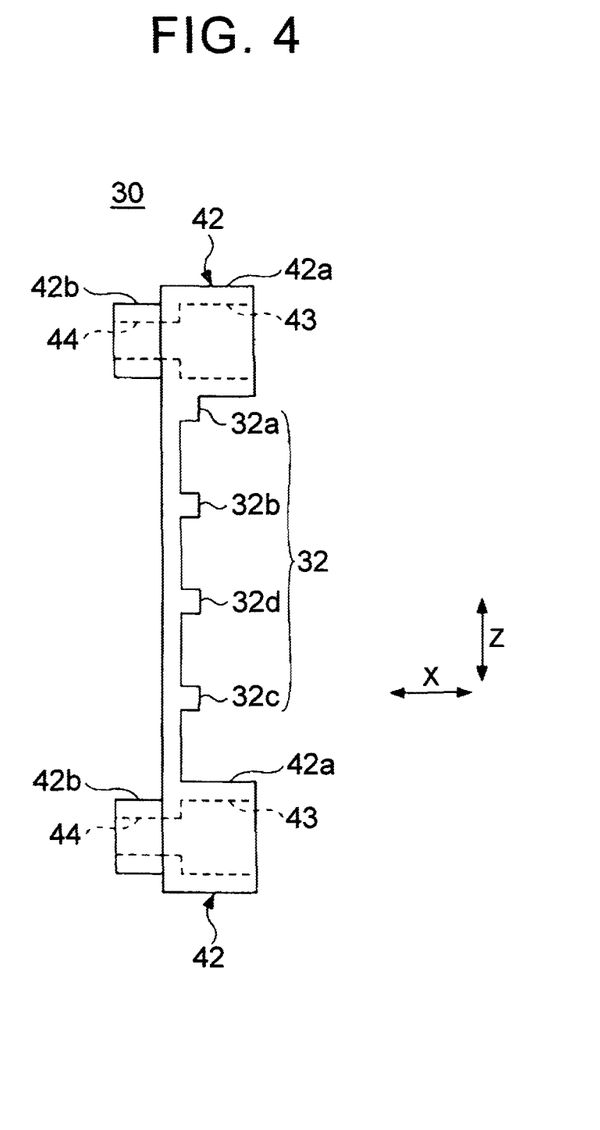
FIG. 4 is a view for schematically showing the example of the partitioning member 30 when seen in a Y-direction.

FIG. 4 is a view for schematically showing an example of the partitioning member 30 when seen in the Y-direction.

The partitioning member 30 has the joining sections 42 on both of an upper section and a lower section. The two joining sections 42 are each provided on the upper section and the lower section. As shown in FIG. 2, the joining section 42 is respectively projected upward or downward to the top surface or a lower surface of the unit cell 10. As shown in FIG. 3, the joining section 42 is formed to be hollow when seen in the X-direction. In other words, the joining section 42 includes holes 43, 44 that extend in the X-direction. In addition, as shown in FIG. 4, the joining section 42 extends in the X-direction. As shown in FIG. 4, the joining section 42 includes a large diameter portion 42a that has the hole 43 and a small diameter portion 42b that has the hole 44. A diameter of the hole 43 is larger than that of the hole 44. Two each of the partitioning members 30 that are adjacent to each other in the X-direction are joined to each other by fitting the small diameter portion 42b of the one into the hole 43 in the large diameter portion 42a of the other. In this joined state, the joining sections 42 on the upper side of the partitioning members 30 extend in two rows in the X-direction and define sidewalls of the exhaust passage S1 (see FIG. 2). In addition, in the joined state, a hollow section that extends in the X-direction is formed by joining the holes 44 in the joining sections 42. The restraining member 46 made of the metal (see FIG. 2) is inserted through the hollow section. Furthermore, in the joined state, the unit cell 10 is disposed between two each of the partitioning members 30 that are adjacent in the X-direction. In other words, two each of the partitioning members 30 are joined by holding the two each of the partitioning members 30 from both sides of the unit cell 10 in the X-direction, and thus each of the unit cells 10 is disposed between two each of the partitioning members 30 that are adjacent in the X-direction.

The partitioning member 30 has plural ribs 32 that are projected in the X-direction on a surface that faces one of the unit cells 10. It should be noted that an opposite surface from the surface that is formed with the ribs 32, that is, a surface that faces the other of the unit cells 10 may be a flat surface that contacts the unit cell 10 on a plane (see FIG. 4).

As shown in FIG. 3, the plural ribs 32 are formed in a T-shape as a whole. In other word, the plural ribs 32 extend in the Z-direction from the lower side (intake side) and are then directed to extend in the Y-direction. Accordingly, a T-shaped cooling passage S3 is defined that extends in the Z-direction from the lower side (intake side) and then is directed to the Y-direction to extend to either edge of the partitioning member 30 in the Y-direction. That is, the cooling passage S3 is defined to let the refrigerant flow in the T-shape on an end surface of the unit cell 10 (end surface in the X-direction). In an example shown in FIG. 3, the plural ribs 32 are formed to be symmetrical about a centerline in the Z-direction that passes through a center of the partitioning member 30 in the Y-direction. More specifically, a rib 32a at the center extends in the Z-direction from a center position in the Y-direction on the lower side of the partitioning member 30 and is then branched to extend to both sides (right and left sides) in the Y-direction. Ribs 32b, 32c on the right side extend in the Z-direction from the lower side of the partitioning member 30 are then directed to one side (right side) in the Y-direction. The ribs 32b, 32c on the left side extend in the Z-direction from the lower side are then directed to one side (left side) in the Y-direction. A rib 32d extends in the Y-direction.

Figure 5:
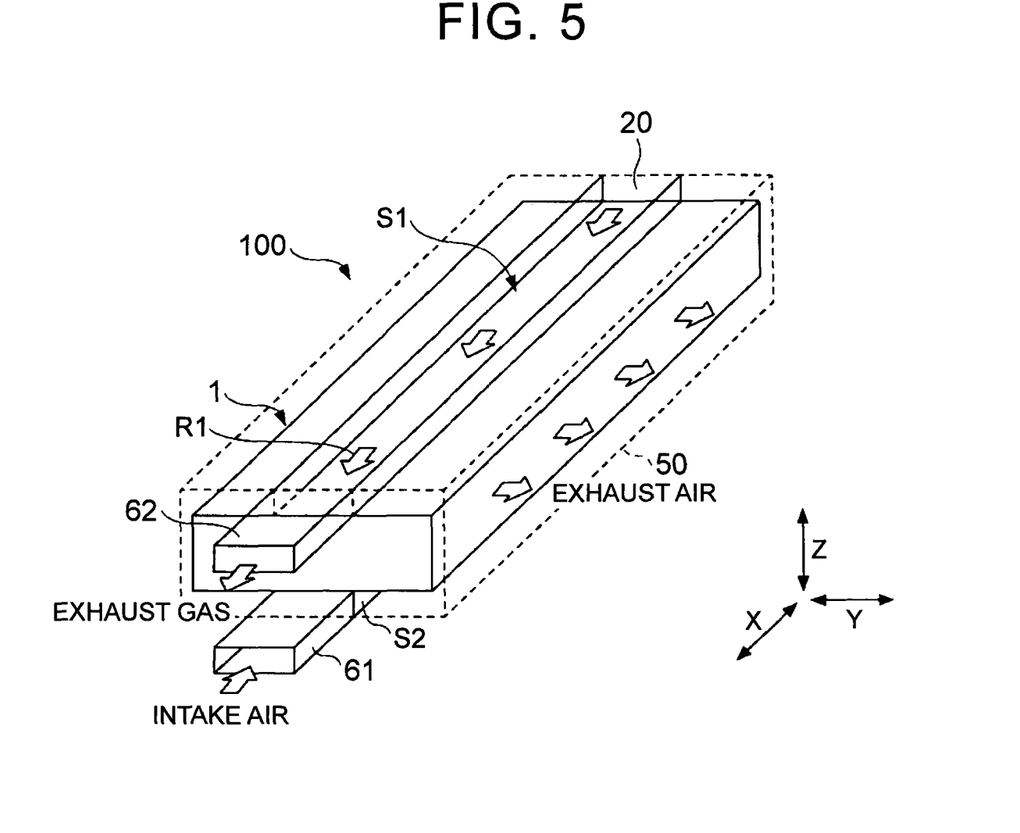
FIG. 5 is a view for schematically showing an aspect of distribution of a refrigerant (air) and a gas in the battery pack 100.

FIG. 5 is a view for schematically showing how the refrigerant (air in this example) and the gas are distributed in the battery pack 100.

In an example shown in FIG. 5, the intake duct 61 communicates with the supply passage S2 that is formed on the lower side of the cell stack 1 and is connected to the pack case 50 in the lower side of the battery pack 100. When the battery pack 100 is installed in the vehicle, the intake duct 61 may be disposed such that an intake port thereof faces a cabin. A means for adjusting an amount (flow rate) of air supply (a blower, for example) may be provided in the intake duct 61. It should be noted that a connecting section of the intake duct 61 and the supply passage S2 may be provided with a seal member (not shown). As described above, the other end of the supply passage S2 that is opposite from the one end connected to the intake duct 61 may be sealed. In the example shown in FIG. 5, the end of the supply passage S2 at the back of the drawing in the X-direction is sealed.

The exhaust duct 62 communicates with the exhaust passage S1 that is formed on the upper side of the cell stack 1 and is connected to the pack case 50 in the upper side of the battery pack 100. A means (a blower, for example) for adjusting the amount (flow rate) of the gas to be discharged may be provided in the exhaust duct 62. It should be noted that a connecting section of the exhaust duct 62 and the exhaust passage S1 may be provided with a seal member (not shown). As described above, the other end of the exhaust passage S1 that is opposite from the one end connected to the exhaust duct 62 is sealed by the sealing member 20, which will be described later. In the example shown in FIG. 5, the end of the exhaust passage S1 at the back of the drawing in the X-direction is sealed by the sealing member 20, which will be described later. However, the exhaust duct 62 may be connected to the end of the exhaust passage S1 at the back of the drawing, and the end of the exhaust passage S1 in the front of the drawing may be sealed by the sealing member 20.

Figure 6:
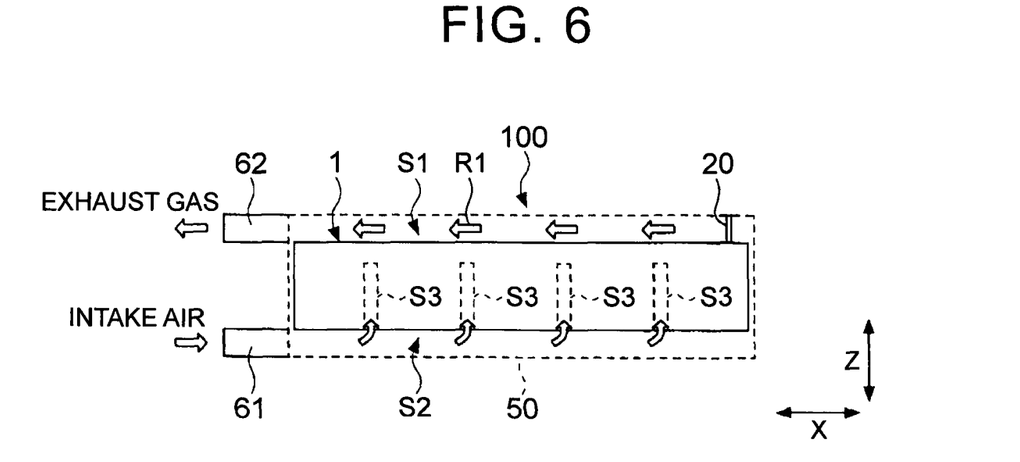
FIG. 6 is a view for schematically showing the aspect of distribution of the refrigerant in the battery pack 100 (in a supply passage S2) when seen in the Y-direction.

FIG. 6 is a view for schematically showing how the refrigerant (in the supply passage S2) and the gas (in the exhaust passage S1) are distributed in the battery pack 100 when seen in the Y-direction.

As shown in FIG. 6, the air that is introduced into the supply passage S2 through the intake duct 61 flows in the X-direction (flows to the right side in FIG. 6) while flowing upward in the Z-direction and is introduced into the cooling passage S3. A flow in the cooling passage S3 will be described later with reference to FIG. 7. As described above, the cooling passage S3 is formed between each of the partitioning members 30 and each of the unit cells 10. It should be noted that, in an example shown in FIG. 6, only four of the cooling passages S3 are virtually shown as a matter of simplicity but the cooling passage S3 is basically formed between each of the partitioning members 30 and each of the unit cells 10. In addition, as will be described later, the cooling passage S3 may be formed between the sealing member 20 and the unit cell 10.

As shown by an arrow R1 in FIG. 6, the gas that is introduced from the inside of each of the unit cells 10 into the exhaust passage S1 through each of the valves 13 flows in the X-direction (flows to the left side in FIG. 6) and is then discharged from the exhaust duct 62 to the outside of the battery pack 100. The flow of the gas in the exhaust passage S1 will be described in detail with reference to FIG. 8 and the following drawings.

Figure 7:
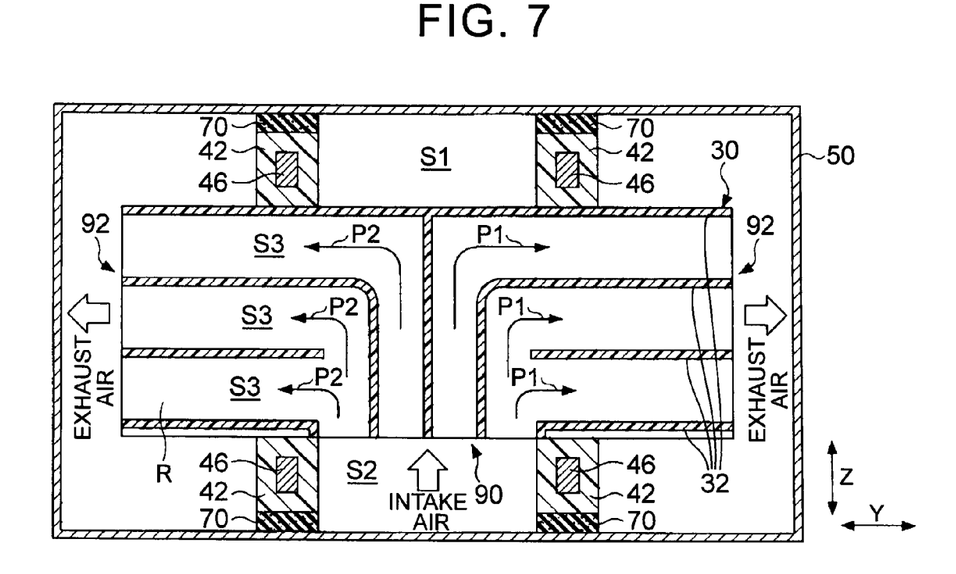
FIG. 7 is a view for schematically showing the aspect of distribution of the refrigerant in the battery pack 100 (in a cooling passage S3) when seen in the X-direction.

FIG. 7 is a view for schematically showing how the refrigerant in the battery pack 100 (in the cooling passage S3) is distributed when seen in the X-direction.

As schematically shown by arrows P1, P2 in FIG. 7, the air that is introduced from an inlet 90 into the cooling passages S3 through the supply passage S2 flows in the T-shape as a whole as a flowing direction thereof is restricted by the ribs 32, and is discharged from outlets 92 on both sides of the cell stack 1 in the Y-direction. More specifically, as schematically shown by the arrows P1, a part of the air that is introduced into the cooling passages S3 through the supply passage S2 flows in the Z-direction from the inlet 90 of the supply passage S2, is then directed to the Y-direction (right side in the drawing) to flow to the side (right side of the cell stack 1), flows through the outlets 92 in the right side of the cell stack 1, and is discharged to the outside of the cell stack 1. Meanwhile, as schematically shown by the arrows P2, the rest of the air that is introduced into the cooling passages S3 through the supply passage S2 flows in the Z-direction from the inlet 90 of the supply passage S2, is then directed to the Y-direction (left side in the drawing) to flow to the side (left side of the cell stack 1), flows through the outlets 92 in the left side of the cell stack 1, and is discharged to the outside of the cell stack 1. It should be noted that the air that is thus discharged to the outside of the cell stack 1 may be discharged to the outside of the cell stack 1 from a clearance or the like that is formed in the pack case 50 or may be discharged to the outside of the cell stack 1 by using an exhaust duct (not shown). If the former structure is adopted, the exhaust duct need not be provided.

Next, the flow of the gas in the exhaust passage S1 will be described in detail together with a structure of the sealing member 20.

Figure 8:
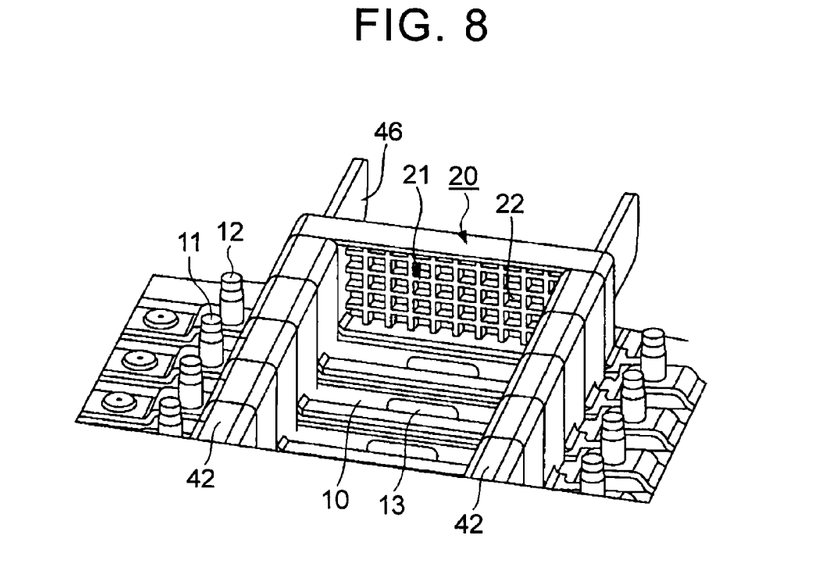
FIG. 8 is a perspective view that corresponds to an enlarged view of a section Q in FIG. 1 and that shows an example of a sealing member 20.

FIG. 8 is a perspective view for showing an example of the sealing member 20 and that corresponds to an enlarged view of a section Q in FIG. 1. The sealing member 20 is formed of a resin material. The sealing member 20 can be formed of any resin material. However, the sealing member 20 may preferably be formed of a general resin material such as polypropylene (PP) or polyamide nylon (PA), for example. It should be noted that the sealing member 20 may be formed of the same resin material as that used for the partitioning member 30.

The sealing member 20 seals the other end of the exhaust passage S1, that is, the end that is not on the exhaust duct 62 side. The sealing member 20 is provided at the other end of the exhaust passage S1 for this purpose. More specifically, the sealing member 20 is provided at an end of the cell stack 1, that is, on the outside of the unit cell 10 that is positioned on the outermost in the X-direction (outside in the X-direction). For example, the sealing member 20 may be provided between the unit cell 10 that is positioned at the end of the cell stack 1 and the end plate 41. In this case, similar to the partitioning member 30, the sealing member 20 is held between the unit cell 10 and the end plates 41 by the binding force of the restraining member 46.

Figure 9:
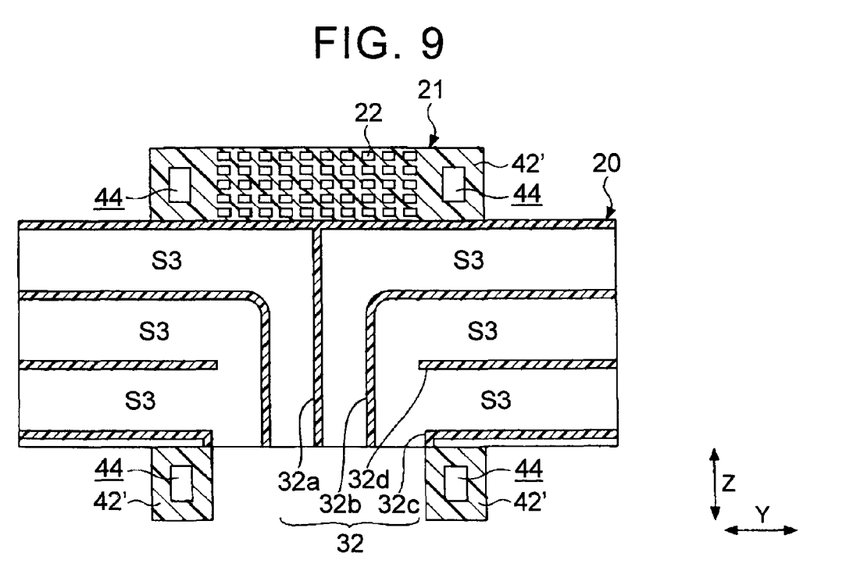
FIG. 9 is a view for schematically showing the example of the sealing member 20 when seen in the X-direction.

FIG. 9 is a view for schematically showing the example of the sealing member 20 when seen in the X-direction. As it can be understood by seeing FIG. 9 in contrast to FIG. 3, the sealing member 20 may have the same structure as the partitioning member 30. More specifically, the sealing member 20 has a portion that faces an end surface in the X-direction of the corresponding unit cell 10 in the X-direction and may be formed with the ribs 32 in the portion. In addition, the sealing member 20 may have plural joining sections 42' that are projected to the upper side and the lower side. The joining section 42' has the substantially same structure as the joining section 42 of the partitioning member 30. However, the joining section 42' of the sealing member 20 only has to be joined to the joining section 42 of the adjacent partitioning member 30 on the inner side in the X-direction. Thus, unlike the joining section 42 of the partitioning member 30, the joining section 42' needs not be joined to the partitioning members 30 on both sides in the X-direction. Consequently, the joining section 42' may include one of the large diameter portion 42a and the small diameter portion 42b of the joining section 42 in the partitioning member 30, for example. Alternatively, the joining section 42' of the sealing member 20 may only be abutted against the joining section 42 of the partitioning member 30 in the X-direction on the inner side in the X-direction.

The sealing member 20 has a sealing section 21 between the joining sections 42' in the Y-direction on the upper side. As shown in FIG. 8, plural bottomed holes, that is, plural recesses 22 are formed in the sealing section 21. The recess 22 is formed to be recessed in the X-direction. The recess 22 is formed on a surface of the sealing member 20 on the exhaust passage S1 side. The number, arrangement manner, opening area, opening shape, depth in the X-direction, and the like of the recess 22 can be arbitrarily determined. A cross-sectional shape of the recess 22 may be constant in a depth direction (the X-direction) or may change in the depth direction. It should be noted that a corner 22a of the recess 22 on an opening side (see FIG. 11) is preferably formed at 90 degrees and thus is not rounded.

Figure 10:
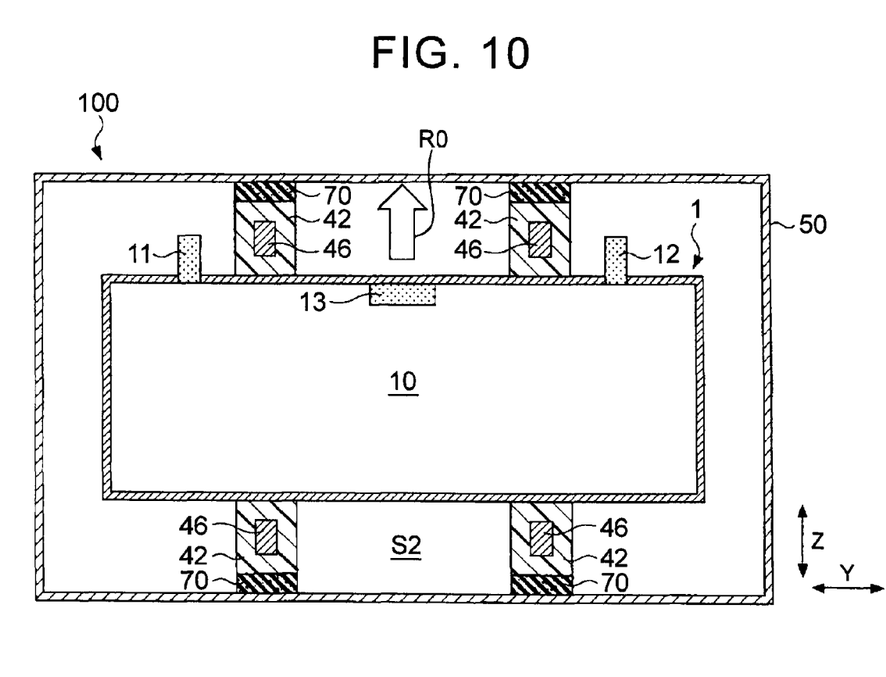
FIG. 10 is a view for schematically showing principle of heat radiation of the gas immediately after, being discharged from a valve 13.

FIG. 10 is a view for schematically showing principle of heat radiation of the gas immediately after being discharged from the valve 13. As shown by an arrow R0 in FIG. 10, the gas immediately after being discharged from the valve 13 moves upward and hits the pack case 50. The pack case 50 in this case is a portion that is located on the upper side of the unit cell 10. Because the pack case 50 is formed of a metal member (sheet metal member) with a favorable heat radiation property, a temperature of the gas immediately after being discharged from the valve 13 can be reduced. In addition, because a volume of the gas is reduced along with the temperature decrease of the gas, pressure in the exhaust passage S1 is also reduced, and thus stress that is applied to a seal portion (joining portion and the like) of the exhaust passage S1 can be lowered. Furthermore, the gas immediately after being discharged from the valve 13 obtains the reduced temperature by hitting the pack case 50 and then contacts the joining section 42 of the partitioning member 30 that defines the sidewall of the exhaust passage S1. Accordingly, it is possible to reduce an influence of the heat to the joining section 42 of the partitioning member 30 that is made of a resin. Therefore, a general resin material can be used for the partitioning member 30 as described above, and thus the cost reduction can be achieved.

Figure 11:
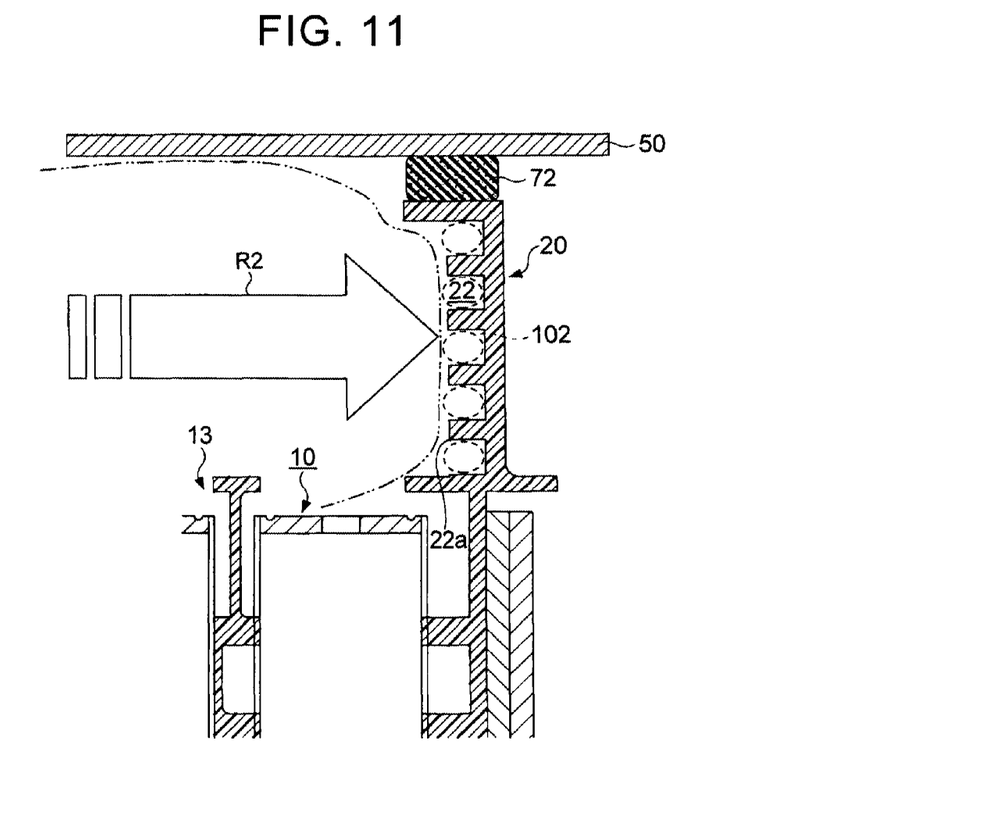
FIG. 11 is a view for explaining a function of a recess 22 in the sealing member 20 as well as a flow of the gas in the proximity of the sealing member 20 in an exhaust passage S1.

FIG. 11 is a cross-sectional view of the end of the exhaust passage S1 including the sealing member 20, and is also a view for explaining a function of the recess 22 in the sealing member 20 as well as the flow of the gas in the proximity of the sealing member 20 in the exhaust passage S1.

As shown by an arrow R2 in FIG. 11, the flow of the gas that is discharged from the valve 13 is stopped by the sealing member 20 at the end of the exhaust passage S1 in the exhaust passage S1. At this time, the air pushed by the gas, that is, the air that exists in the exhaust passage S1 before discharge of the gas is trapped in the recess 22 of the sealing member 20, and thus an air layer 102 is formed in the recess 22. This occurs by a difference in specific gravity between the gas and the air. The thus-formed air layer 102 in the recess 22 performs a function to delay (relax) a temperature transfer from the gas to the sealing member 20. Accordingly, it is possible to reduce the influence of the heat to the resinous sealing member 20. Therefore, as described above, a general resin material can be used for the sealing member 20, and thus the cost reduction can be achieved.

In addition, a heat mass (heat transferring property) of the sealing member 20 itself can be increased by forming the recess 22 in the sealing member 20. When the corner 22a on an entering side of the recess 22 is formed at 90 degrees, it is possible to prevent the gas from entering the recess 22, and it is thus possible to further delay the temperature transfer from the gas to the sealing member 20.

The following effects can be obtained according to the embodiment that has been described so far.

In this embodiment, as described above, the plural recesses 22 are formed in the sealing member 20 for sealing the end in the exhaust passage S1. Thus, when the gas is discharged from the valve 13 into the exhaust passage S1, the air layer 102 is formed in the recess 22 of the sealing member 20. Accordingly, it is possible to delay the temperature transfer from the high-temperature gas to the sealing member 20 and also possible to reduce the influence of the heat to the resinous sealing member 20. Therefore, as described above, a general resin material can be used for the sealing member 20, and the cost reduction can be achieved.

As described above, because an upper wall of the exhaust passage S1 is formed by the metal pack case 50, the gas immediately after being discharged from the valve 13 hits the pack case 50. Accordingly, it is possible to effectively reduce the temperature of the gas immediately after being discharged from the valve 13. As a result, a general resin material can be used for the partitioning member 30 that defines the sidewall of the exhaust passage S1, and the cost reduction can be achieved.

As described above, the seal members 70, 72 are respectively provided between the pack case 50 and the upper surface of the joining section 42 on the partitioning member 30 and between the pack case 50 and the upper surface of the sealing member 20 (upper surfaces of a sealing section 21 and the joining section 42'). Accordingly, it is possible to reduce leakage of the gas from the inside of the exhaust passage S1. However, one of or both of the seal members 70, 72 may not be provided. In particular, the pressure in the exhaust passage S1 is reduced along with the temperature decrease of the gas that is achieved by a heat radiating action of the pack case 50 as described above, and thus it is possible to reduce the leakage of the gas from the inside of the exhaust passage S1 even in the case where one of or both of the seal members 70, 72 are not provided.

As described above, the inlet 90 for the cooling air is provided on the lower side of the cell stack 1, and the outlet 92 is provided on both of the right and left sides of the cell stack 1. Therefore, the exhaust passage S1 can be formed separately from the supply passage S2 and the cooling passage S3. In other words, only the gas that is generated in the unit cell 10 can independently be discharged to the outside of the pack case 50. However, the cooling passage S3 may be formed in the vertical direction (the rib 32 may be formed in the Z-direction) so as to communicate the exhaust passage S1 and the cooling passage S3.

As described above, the exhaust passage S1 is defined by the joining sections 42 of the partitioning member 30. Therefore, it is possible to reduce the number of components when compared to a structure where a member other than the partitioning member 30 is used to define the exhaust passage S1. However, the joining sections 42 of the partitioning member 30 may not be provided, and the member other than the partitioning member 30 may be used to form the exhaust passage S1. In addition, the hollow section that is formed in the joined state of the joining sections 42 of the resinous partitioning members 30 is used to insert the restraining member 46 on the upper side therethrough. Therefore, there is no need of an additional step to insulate the restraining member 46 that is made of a metal.

As described above, the supply passage S2 is defined by the joining sections 42 of the partitioning member 30. Therefore, it is possible to reduce the number of components when compared to a structure where a member other than the partitioning member 30 is used to define the supply passage S2. However, the joining sections 42 of the partitioning member 30 may not be provided, and the member other than the partitioning member 30 may be used to form the supply passage S2. In addition, the hollow section that is formed in the joined state of the joining sections 42 of the resinous partitioning members 30 is used to insert the restraining member 46 on the lower side therethrough. Therefore, there is no need of an additional step to insulate the restraining member 46 that is made of a metal.

The preferred embodiment of the present invention has been described in detail so far. However, the present invention is not limited to the above-described embodiment, and various modifications and replacements can be made for the above-described embodiment without departing from the scope of the present invention.

For example, in the embodiment described above, similar to the partitioning member 30, the sealing member 20 has a portion to face the end surface of the unit cell 10 in the X-direction. However, the portion may not be provided. In other words, the sealing member 20 does not have to be held between the unit cell 10 and the end plates 41 and may be fixed to the cell stack 1 in another aspect. For example, the sealing member 20 may be configured of the joining sections 42' on the upper side and the sealing section 21 between the joining sections 42' in the Y-direction, or may substantially be configured of the sealing section 21 alone.

In the embodiment described above, the cooling passage S3 in which the refrigerant flows in the T-shape is formed. However, any structure can be adopted for the cooling passage S3, and the cooling passage S3 may be of a type in which the refrigerant flows in a width direction (the Y-direction), a type in which the refrigerant flows in the vertical direction (the Z-direction), or a combination thereof.

In the embodiment described above, the partitioning member 30 partitions between the plural unit cells 10 as the unit cell 10 being a single cell unit. However, the plural unit cells 10 may be modularized, and the partitioning member 30 may partition between plural modules as the module being the single cell unit.

In the embodiment described above, the partitioning member 30 is used to partition between the plural unit cells 10. However, the partitioning member 30 may not be provided. In this case, each of the unit cells 10 may be insulated. For example, the unit cell 10 is insulated by forming an insulating layer on the end surfaces in the X-direction. In addition, when the partitioning member 30 is not provided, a configuration that corresponds to the rib 32 of the partitioning member 30 may be formed on the end surface the unit cell 10 in the X-direction.

In the embodiment described above, the rib 32 is provided in the partitioning member 30. However, instead of this or in addition to this, the same rib may be provided on a surface of the unit cell 10 in the X-direction.

In the embodiment described above, the refrigerant is used to cool the unit cell 10; however, it may be used to heat the unit cell 10 if necessary.

The invention claimed is:

1. A power storage device comprising:
   plural cells aligned in a first direction, each of the cells including a gas discharging valve for discharging a gas generated in the cell, each of the gas discharging valves being provided on a first side in a second direction of the cell, and the second direction being orthogonal to the first direction;
   an exhaust passage configured to discharge the gas discharged from each of the gas discharging valves of the plural cells, the exhaust passage extending in the first direction, and the exhaust passage having an opening at a first end in the first direction; and
   a sealing plate provided at a second end of the exhaust passage in the first direction, the sealing plate including plural recesses on a surface on the exhaust passage side of the sealing plate, the surface being orthogonal to the first direction, and the sealing plate being made of a resin.

2. The power storage device according to claim 1, further comprising:
   a cover member disposed separately from the cell on the first side in the second direction of the cell, the cover member defining a wall of the exhaust passage on the first side in the second direction of the exhaust passage, the cover member facing the gas discharging valve with interval in the second direction of the gas discharging valve, and the cover member being made of a metal.

3. The power storage device according to claim 1 or 2, further comprising:
   plural partitioning plates, each of the partitioning plates being provided between the cells in the first direction, and each of the partitioning plates including a joining section projected to the first side in the second direction of the cell, the joining sections extending in two rows in the first direction, the joining sections defining a sidewall of the exhaust passage, and the gas discharging valve being positioned between the two rows of the joining sections.

4. The power storage device according to claim 1 wherein, the cells define a cooling passage between the cell and the adjacent cell in the first direction, a cooling medium which configured to cool the cell flows through the cooling passage, and the cooling passage is partitioned from the exhaust passage.

5. The power storage device according to claim 3 further comprising:
   a pair of end plates placing the plural cells between the end plates in the first direction; and
   a restraining member, each end of which being bonded to the corresponding end plate, the restraining member being located on the first side in the second direction of the cell, the restraining member extending in the first direction, and the restraining member configured to restrain the plural cells in the first direction,
   wherein the joining section has a hollow section therein that extends in the first direction, and the restraining member is inserted through the hollow section.

6. The power storage device according to claim 2, further comprising:
   plural partitioning plates, each of the partitioning plates being provided between the cells in the first direction, and each of the partitioning plates including a joining section projected to the first side in the second direction of the cell, the joining sections extending in two rows in the first direction, the joining sections defining a sidewall of the exhaust passage, and the gas discharging valve being positioned between the two rows of the joining sections.

7. The power storage device according to claim 6 further comprising:
   a sealing member provided between the cover member and the joining section.

* * * * *